US008916047B2

(12) United States Patent
Hruza

(10) Patent No.: US 8,916,047 B2
(45) Date of Patent: Dec. 23, 2014

(54) ACCELERATED BIOREMEDIATION USING SUPPLEMENTAL COMPOSITIONS AND OXYGENATED WATER

(75) Inventor: Sandra L. Hruza, Porter, TX (US)

(73) Assignee: Bionutratech, Inc., Porter, TX (US)

( * ) Notice: Subject to any disclaimer, the term of this patent is extended or adjusted under 35 U.S.C. 154(b) by 760 days.

(21) Appl. No.: 13/183,493

(22) Filed: Jul. 15, 2011

(65) Prior Publication Data

US 2012/0012526 A1    Jan. 19, 2012

Related U.S. Application Data

(60) Provisional application No. 61/365,127, filed on Jul. 16, 2010.

(51) Int. Cl.

| | | |
|---|---|---|
| C02F 3/00 | (2006.01) | |
| B09C 1/10 | (2006.01) | |
| C02F 3/34 | (2006.01) | |
| C02F 7/00 | (2006.01) | |
| C02F 1/68 | (2006.01) | |
| C02F 103/06 | (2006.01) | |
| C02F 101/32 | (2006.01) | |
| C02F 3/20 | (2006.01) | |

(52) U.S. Cl.
CPC ............... *B09C 1/10* (2013.01); *C02F 2209/22* (2013.01); *C02F 3/344* (2013.01); *C02F 7/00* (2013.01); *C02F 2209/44* (2013.01); *C02F 2209/20* (2013.01); *C02F 2103/06* (2013.01); *C02F 1/687* (2013.01); *C02F 3/343* (2013.01); *C02F 2101/32* (2013.01); *C02F 3/20* (2013.01); *C02F 3/006* (2013.01)
USPC ............ 210/606; 210/610; 210/620; 210/621

(58) Field of Classification Search
USPC .......................... 210/610–611, 606, 620, 621
See application file for complete search history.

(56) References Cited

U.S. PATENT DOCUMENTS

| 5,443,845 A | 8/1995 | Felix |
|---|---|---|
| 5,725,885 A | 3/1998 | Felix et al. |

(Continued)

FOREIGN PATENT DOCUMENTS

| DE | 102007003644 A1 | 7/2008 |
|---|---|---|
| EP | 0646642 A1 | 4/1995 |

OTHER PUBLICATIONS

PCT/US2011/044106 International Searching Authority, "Notification Concerning Transmittal of International Preliminary Report on Patentability", Aug. 29, 2013, 8 pages. This PCT application is related to the present U.S. Appl. No. 13/183,493.

(Continued)

*Primary Examiner* — Chester Barry
(74) *Attorney, Agent, or Firm* — Jeffrey L. Streets; Streets & Steele

(57) ABSTRACT

A method for bioremediation of contaminants, comprising contacting a contaminant with composite particles including at least one microbial available nutrient species and at least one fatty acid species, and contacting the contaminant with oxygenated water including greater than about 4 parts per million dissolved oxygen. Water may be oxygenated on-site using various oxygenating devices, such as an aspirator, aerator, impeller and diffuser. Optionally, the oxygenated water may be prepared with wastewater that is being remediated. The method may be used to maintain a dissolved oxygen concentration of greater than a setpoint concentration, such as at least 4 ppm. A preferred oxygenated water stream or source has a dissolved oxygen concentration of greater than 50 ppm. Where the contaminant is in a wastewater, the dissolved oxygen concentration in the remediation zone or the oxygenated water stream may be measured with a dissolved oxygen sensor.

22 Claims, 2 Drawing Sheets

(56) References Cited

U.S. PATENT DOCUMENTS

| | | | |
|---|---|---|---|
| 5,954,868 A | 9/1999 | Felix et al. | |
| 6,277,278 B1 | 8/2001 | Hruza | |
| 6,277,279 B1 | 8/2001 | Hruza | |
| 6,472,198 B1 * | 10/2002 | Semprini et al. | 435/262.5 |
| 6,945,925 B2 * | 9/2005 | Pooler et al. | 588/250 |
| 7,008,535 B1 | 3/2006 | Spears et al. | |
| 7,294,278 B2 | 11/2007 | Spears et al. | |
| 7,393,521 B2 | 7/2008 | Hruza | |
| 7,785,468 B2 * | 8/2010 | Baseeth et al. | 210/610 |
| 7,799,360 B2 | 9/2010 | Ronning et al. | |
| 2003/0113903 A1 | 6/2003 | Miyazaki | |
| 2007/0197415 A1 | 8/2007 | Ronning | |

OTHER PUBLICATIONS

PCT/US2011/044106 International Searching Authority, "The International Search Report and Written Opinion of the International Searching Authority", Aug. 9, 2013, 11 pages. This PCT application is related to the present U.S. Appl. No. 13/183,493.

* cited by examiner

ACCELERATED BIOREMEDIATION USING SUPPLEMENTAL COMPOSITIONS AND OXYGENATED WATER

CROSS-REFERENCE TO RELATED APPLICATIONS

This application claims priority to U.S. provisional patent application Ser. No. 61/365,127, filed on Jul. 16, 2010.

BACKGROUND

1. Field of the Invention

The present invention relates to bioremediation of contaminants, such as oil.

2. Background of the Related Art

Despite governmental regulations and industrial efforts, oil spills of great magnitude can occur as a result of an accident or failure of one or more safety systems. The vast demand for petroleum products has been met by increased shipments of oil in ocean going tankers, barge traffic and the like, as well as a continuing array of new technology. However, equipment malfunctions and/or human error would suggest that there will occasionally be an oil spill. Unfortunately, without adequate clean up technology, the environment can suffer devastating damage.

Much of the effort to cleanup such spills has centered on mechanical methods to contain and remove the spilled oil and to clean oil contaminated areas. However, these methods are not entirely satisfactory because much of the oil either cannot be contained or escapes containment. For example, the use of oil-absorbing booms have a limited capacity for absorbing oil and water waves can carry oil right over the top of the boom. Even when contained, mechanical removal is at best only partial.

On open waters, oil can sometimes be burned off. Such burning may require further use of special booms pulled by boats to gather a critical amount of oil into one place where it can be burned effectively. However, such techniques require smooth water conditions and the burning itself can produce harmful emissions.

Although mechanical methods and burning may be inferior under the best of conditions, these techniques are completely unacceptable for dealing with oil that has already entered into a sensitive ecosystem. For example, marshlands would be destroyed by either of these techniques.

Bioremediation presents an alternative that utilizes natural environmental biology for dealing with the oil. In particular, naturally occurring microorganisms that exist in the vicinity of an oil spill are typically capable of using the oil for their own growth. It is a distinct advantage that these biological processes can occur without wholesale disturbances to the ecology. Unfortunately, natural biological processes can take time. Where the oil spill overwhelms an ecosystem, the oil may damage or kill many plants and animals before the natural biological processes can get rid of the oil.

BRIEF SUMMARY

One embodiment of the present invention provides a method for bioremediation of contaminants, comprising contacting a contaminant with composite particles including at least one microbial available nutrient species and at least one fatty acid species, and contacting the composite particles with oxygenated water including greater than about 6 parts per million dissolved oxygen. Such method is suitable for bioremediation of a wide variety of contaminants disposed in water or on soil, such as hydrocarbons, nitrogen-containing contaminants, phosphorus-containing contaminants, metals, and FOG (fats, oil, and grease).

DETAILED DESCRIPTION

Figure 1:
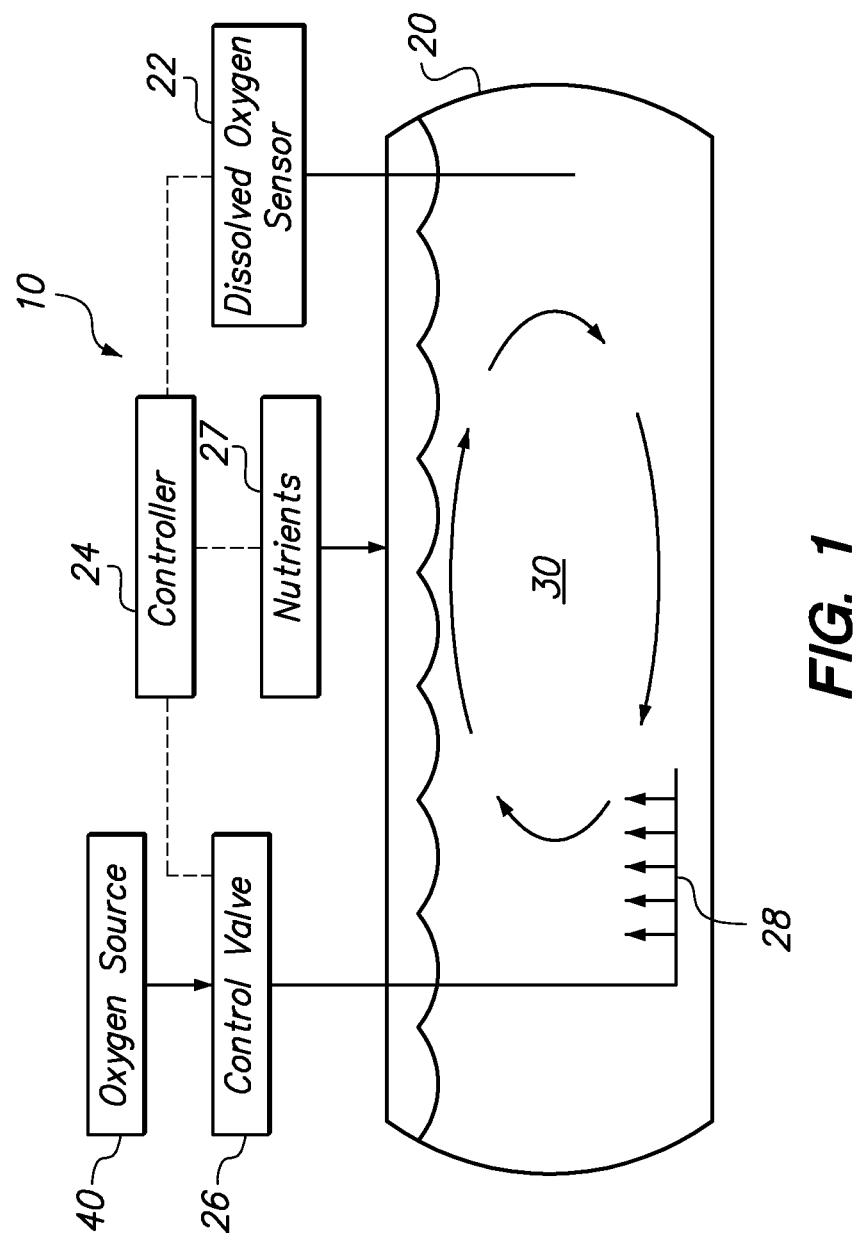
FIG. 1 is a diagram of an apparatus for performing bioremediation of contaminants in wastewater.

One embodiment of the present invention provides a method for bioremediation of contaminants, comprising contacting a contaminant with composite particles including at least one microbial available nutrient species and at least one fatty acid species, and contacting the contaminant with oxygenated water including greater than about 6 parts per million dissolved oxygen.

In another embodiment, the method further comprises oxygenating water on-site prior to the step of contacting the contaminant with the oxygenated water. Optionally, the water is oxygenated using a device selected from an aspirator, aerator, impeller and diffuser. In a further option, the water is oxygenated using a device made and operated in accordance with U.S. Pat. No. 7,294,278, which patent is incorporated herein by reference. In a still further option, the step of oxygenating water may include collecting water that is in contact with the contaminant, introducing oxygen into the collected water, and reintroducing the oxygenated water into contact with the contaminant and composite particles. It should be recognized that in application where the contaminant is disposed in water, the contaminant, composite particles, and oxygen will become intimately mixed in the water, such that the water collected to be oxygenated may include any or all of these components therein. The step of reintroducing the oxygenated water may include supplying the oxygenated water through a laminar flow nozzle in order to help keep the dissolved oxygen from evolving out of the water.

In a further embodiment, the method further comprises maintaining a dissolved oxygen concentration of greater than a setpoint concentration in the water contacting the composite particles. The setpoint concentration may vary from one application to another depending upon various conditions and objectives. However, a setpoint concentration of at least 6 ppm is desirable, and remediation may still be accelerated with at least 2 ppm. It should be emphasized that the dissolved oxygen concentration prevailing in a remediation zone is typically much less than the dissolved oxygen concentration of a water stream that has just been oxygenated. The oxygenated water stream circulates or diffuses into the larger amount of water in the remediation zone and oxygen is continually being utilized by microorganisms throughout the remediation zone. A preferred oxygenated water stream or source has a dissolved oxygen concentration of greater than 50 ppm, most preferably between 150 and 800 ppm. Preferably, the dissolved oxygen concentration in the remediation zone will rise to at least 15 ppm upon addition of the oxygenated water and may be allowed to lower to the setpoint concentration before adding more dissolved oxygen via the addition of oxygenated water.

In another embodiment, the composite particles and oxygenated water are used in a closed system by adding 0.125 grams of the composite particles per liter of wastewater. In one option, the composite particles may be mixed into the oxygenated water prior to contacting the contaminant. In a second option, the composite particles and the oxygenated water may be separately introduced into contact with the contaminant.

In a still further embodiment, the method further comprises measuring the dissolved oxygen concentration in the remediation zone with a dissolved oxygen sensor disposed in the water contacting the contaminant. When the measured dissolved oxygen concentration is less than the setpoint concentration, then it is necessary to provide additional oxygenated water until the measured dissolved oxygen concentration rises above the setpoint concentration. It should be recognized that the control of the dissolved oxygen concentration may include a hysteresis function to avoid short repetitive cycling of the oxygenation device.

While the composite particles and oxygenated water are suitable for bioremediation of most contaminants, the method may further comprise introducing non-indigenous microbes and/or enzymes into the remediation zone, such as into the oxygenated water stream or directly into the wastewater.

The methods of the present invention may be used for bioremediation of one or more contaminant that is disposed in water or disposed in soil. However, wherein the contaminant is disposed in soil it will typically not be possible to measure a dissolved oxygen concentration since the water does not form a liquid pool in which a dissolved oxygen sensor can be positioned. Rather, contaminants in soil or similar solid particulate materials may be treated in a bioventing system. The nutrients may be mixed with water, such as the oxygenated water, to form a slurry for injecting into the soil. Optionally, one pound of nutrients may be slurried with 2 to 10 gallons of water, most preferably about 4 gallons of water. Such one pound of nutrient, such as one of the composite nutrient formulations described herein, may be used for each cubic yard of contaminated soil. Afterward the slurry injection, additional oxygenated water may be applied to spread the slurry throughout the plume area.

The methods of the present invention are well suited for bioremediation of a wide variety of contaminants disposed in water or on soil, such as hydrocarbons, nitrogen-containing contaminants, phosphorus-containing contaminants, heavy metals, animal waste, fecal matter, and FOG (fats, oil, and grease).

The composite particles include microbial nutrients that held together or coated with an oleophilic and biodegradable coating. The coating may comprise oleic acid and a carboxylic acid selected from the group consisting of stearic acid, palmitic acid, and mixtures thereof. The preferred ratio of oleic acid to the selected carboxylic acid is between about 70:30 and about 30:70 by weight. The composite particles may also be prepared in accordance with any one or more of the embodiments disclosed in U.S. Pat. Nos. 5,443,845; 5,725,885; and 5,954,868, which patents are incorporated by reference herein. One embodiment of these composite particles is available as VB591™ from Bionutratech, Inc. of Porter, Tex.

The nutrients in the composite particles comprise water soluble microbial available nutrients selected from the group consisting of nitrogen in the form of ammonium or urea compounds, phosphorous in the form of microbial available phosphate compounds, and iron in the form of microbial available iron compounds. The coating formulation of this invention uses a mixture of saturated and unsaturated fatty acids to form a coating material which is readily biodegradable, has physical properties making it efficient for encapsulating the microbial nutrients, increases the oil phase partitioning of the composite, and reduces the cost of manufacture. The coating helps retain the nutrients within the oil phase of an oil and water mixture as occurs in an oil spill in an aquatic or wetland environment. Furthermore, the nutrients are released and/or activated over a period of time based upon biological demands of the microorganisms through degradation of the encapsulating coating and partial dissolution of the coating into the oil phase.

The rate of natural biodegradation of spilled oil in the environment is usually limited by insufficient quantities of microbial available nitrogen and phosphorous. However, the application of water soluble nitrogen and phosphorous to spills in aquatic environments has proven to be ineffective because the nutrients are rapidly dissipated into the surrounding water volume. Nutrient additive formulations have typically suffered from a number of problems including incomplete partitioning of the nutrients into the oil phase, poor biodegradability of encapsulating materials and the difficulty and high cost of manufacturing.

The preferred nutrient formulations for fostering the growth of petroleum degrading bacteria have the following exemplary proportions: between about 90 and about 94 percent (%) by weight ammonium sulfate, urea or combinations thereof as a source of nitrogen; between about 5 and about 8 percent (%) by weight potassium phosphate dibasic or substitutions such as potassium phosphate monobasic or calcium phosphate monobasic, dibasic or tribasic, urea phosphate, or ammonium phosphate; and between about 1 and about 2 percent (%) by weight ferrous sulfate or a substitution such as ferrous sulfate heptahydrate.

The most preferred nutrient formulations have an ammonium/urea:phosphate compound:iron compound ratio between about 90:8:2 and about 94:5:1. The precise formulation of nutrients can vary according to the specific type of microorganism present in the water, the composition of the spilled oil and the current costs of each nutrient source. The nutrient formulation is mixed together as dry ingredients and ground into a powder sufficient to pass a U.S. standard number 40 sieve.

In order to prevent rapid dilution of these water soluble nutrients upon application, a water-insoluble coating is applied which is lipophilic and oleophilic. This coating is vital to the retention of the nutrient product in the oil phase where it is needed to support bacterial growth. It is also important that the coating release the nutrients and oxygen gradually over the period between applications.

The rate at which the product components are released is determined by partial dissolution of the coating in the oil phase and biological degradation of the coating caused by the microorganisms. As hydrocarbon degrading microbes utilize the available petroleum hydrocarbons, they concomitantly metabolize the component fatty acids constituting the coating mixture which encapsulate the essential nutrient formulation. As the coating becomes perforated, the inner core of water soluble nutrients and oxygen releasing components are dissolved into the oil. In this fashion, the encapsulated nutrients are made available over time upon biologically mediated demand. Supplemental applications of the nutrient composite can be made to ensure sufficient nutrient concentrations are available to foster and sustain enhanced microbial growth.

The coating formulation preferably includes a mixture of saturated and unsaturated fatty acids to form a coating material which is readily biodegradable, has physical properties making it efficient for encapsulating microbial nutrients, increases the oil phase partitioning of the composite, and reduces the cost of manufacture. More particularly, the encapsulation for the core of nutrients is formed of an oleophilic and biodegradable coating comprising oleic acid and a carboxylic acid selected from the group consisting of stearic acid, palmitic acid, and mixtures thereof. The preferred ratio of oleic acid (unsaturated) to the selected carboxylic acid (saturated) is between about 70:30 and about 30:70 by weight.

The coating of the present invention may be prepared with any ratio of saturated fatty acids and unsaturated fatty acids where the coating is sufficiently biodegradable to release nutrients as needed and has a sufficiently high melting temperature to allow the coated nutrient to be stored without clumping together. The preferred coating formulation comprises the following: between about 30 and about 70 percent (%) by weight saturated fatty acids, such as stearic acid, including commercial preparations such as EMERSOL 132, PROMULSIN and PROVISCOL WAX, or palmitic acid, or mixtures thereof; and between about 30 and about 70 percent (%) by weight oleic acid.

It is most preferred that the coating include between about 2% and about 5% of stearamide, palmitamide or oleamide to extend the period of time over which the nutrients are released and to additionally enhance the nutrient availability of the coating mix itself.

The invention further provides a method of using or applying coated nutrients to foster microbial growth for conversion of an oil slick. The material is applied to an oil spill as soon as possible to begin microbial development. The preferred dosage is a rate of 10 to 15 pounds per barrel of spilled oil. The material can be reapplied at time intervals ranging from 48 to 96 hours. The application can be achieved by any conventional means including, but not limited to, spraying, dusting, and dropping from an airplane.

The composite particles can be applied to an oil spill using conventional powder spraying equipment with no pre-mixing or dilution required. Application of the product may also be achieved by hand broadcasting, dust blowing or by aircraft. Soft clumps may form after prolonged storage, but they are easily broken by mechanical mixing.

Initial applications to open water spills should be 5-15 pounds of product per barrel of spilled oil (approximately 14-43 kilograms per cubic meter of spilled oil), but should not exceed 250 pounds per acre (280 kilograms per hectare) of surface area per application. The product should be applied to spilled oil as soon as possible following spillage to stimulate natural oil utilizing microbial populations to maximize biodegradation activity. Follow-up applications may be made at 48-96 hour intervals until the oil is completely consumed. The exact interval and the weight of product per acre is based upon factors such as the degree of reduction in oil by clean-up activities and natural loss by evaporation, droplet formation, dispersion, composition of the oil, type of bacteria present and microbial activity. Application of this novel product to spilled oil does not significantly alter the physical consistency of the spilled oil, and will not adversely impact conventional clean-up activities, nor will conventional containment and removal activities adversely harm the activity of the coated nutrient product.

Application of the product to wetland spills should be limited to the area of oil contamination. The best possible estimate of quantity of oil concentration is used to calculate the quantity of product to be applied in this instance. Recommended application is 10-25 pound of product per barrel of oil spilled (approximately 28-71 kilograms per cubic meter of oil spilled), but should not exceed 250 pounds per acre (280 kilograms per hectare). The product should be directly applied to the oil contaminated habitat by use of dust delivery equipment. The product should be applied directly to any visible oil and all visible oil should be lightly coated. In general, successive light treatments are preferred over a single heavy application. Follow-up application should be made at weekly or bi-weekly intervals. The product is most effective where oil has not formed a hard exterior crust that prevents the nutrient product from integrating into the oil layer itself.

Application of the product to beach spills should be made directly onto the oil at 15-30 pounds per barrel of spilled oil (approximately 43-86 kilograms per cubic meter of oil spilled). Where the spilled oil is mixed with sand or beach cobbles, the product should be directly sprayed onto contaminated areas and mixed into the beach material if possible. In this situation, an application may be increased to 300 pounds per acre (approximately 336 kilograms per hectare).

FIG. 1 is a diagram of a system 10 for performing bioremediation of contaminants in wastewater. The system 10 includes a tank 20 for receiving wastewater 30 and holding the wastewater during the bioremediation process. The tank includes a dissolved oxygen (DO) sensor 22 that extends into the wastewater to measure the concentration of dissolved oxygen. A signal from the dissolved oxygen sensor 22 is input to a controller 24. In one embodiment, the controller 24 is provided with an upper DO setpoint and lower DO setpoint and maintains the DO concentration in the tank between the upper and lower DO setpoints. The controller 24 provides an output signal that actuates a control valve 26 in fluid communication with an oxygen source 40. Accordingly, when the DO sensor 22 indicates to the controller that the DO concentration in the wastewater is less than the lower DO setpoint, then the control valve 26 is actuated to an open position to deliver oxygen from the oxygen source 40 into the wastewater 30 through a submerged nozzle or manifold 28. Proper placement and orientation of the nozzle or manifold 28 can provide circulation of the wastewater in the tank 30. Nutrients 27 are periodically added to the tank to become mixed with the wastewater to stimulate bacterial growth and bioremediation of contaminants in the wastewater. Although the nutrients may be manually added to the tank, it is also possible for the nutrients 27 to be periodically supplied using an actuatable particulate dispenser that responds to a signal from the controller 24. Periodic or continuous sampling of the wastewater to determine the concentration of one or more target contaminants may provide an indication of the quantity and scheduling of further nutrient additions.

If the oxygen source has a sufficient capacity, then the DO concentration in the wastewater should slowly rise. The rate of the rise is at least in part a function of the rate of oxygen consumed by the bacteria and may be used as a measure of the rate of the bioremediation process. For example, a slow rise in DO concentration indicates a slower rate of bioremediation than would a rapid rise in DO concentration. When the DO sensor 22 indicates to the controller that the DO concentration in the wastewater has reached the upper DO setpoint, then the control valve 26 is closed. Careful selection of the upper and lower DO setpoints allows for a continuous supply of sufficient oxygen to support an accelerated rate of nutrient-driven bioremediation.

If the oxygen source is a supply of oxygen gas, then the nozzle or manifold 29 may be or include a sparger. However, the oxygen source may also be a supply of water containing dissolved oxygen. One such oxygen source is a system described in the Example below.

EXAMPLE

Testing was performed to evaluate the effect of oxygenation and microbial nutrient addition on the treatment of oily wastewater containing hydrocarbons generated by naval vessels. Oily wastewater from a naval vessel was transferred into a tank. The wastewater was dark black and hydrocarbon odors were noted in the tank. The wastewater was mixed thoroughly prior to sampling to provide a composite sample of the tank contents. Based on the pre-treatment results, concentrations of zinc (18 milligrams per liter; mg/L), biological oxygen demand (BOD, 220 mg/L), total suspended solids (TSS, 1,200 mg/L), mineral oil (630 mg/L), and animal and vegetable fat (200 mg/L) exceeded the Japanese Environmental Governing Standards (JEGS) for Wastewater.

The bioremediation process relied upon bacteria native to the oily wastewater. No external source of bacteria of any kind was added to the wastewater. Water was oxygenated using a dissolved oxygen delivery system (DynamOx® 9-215, available from Dynamox of Warren, Mich.) and a microbial nutrient formulation (VB-591™ microbial available nutrients, available from BioNutraTech, Inc. of Porter, Tex.).

Figure 2:
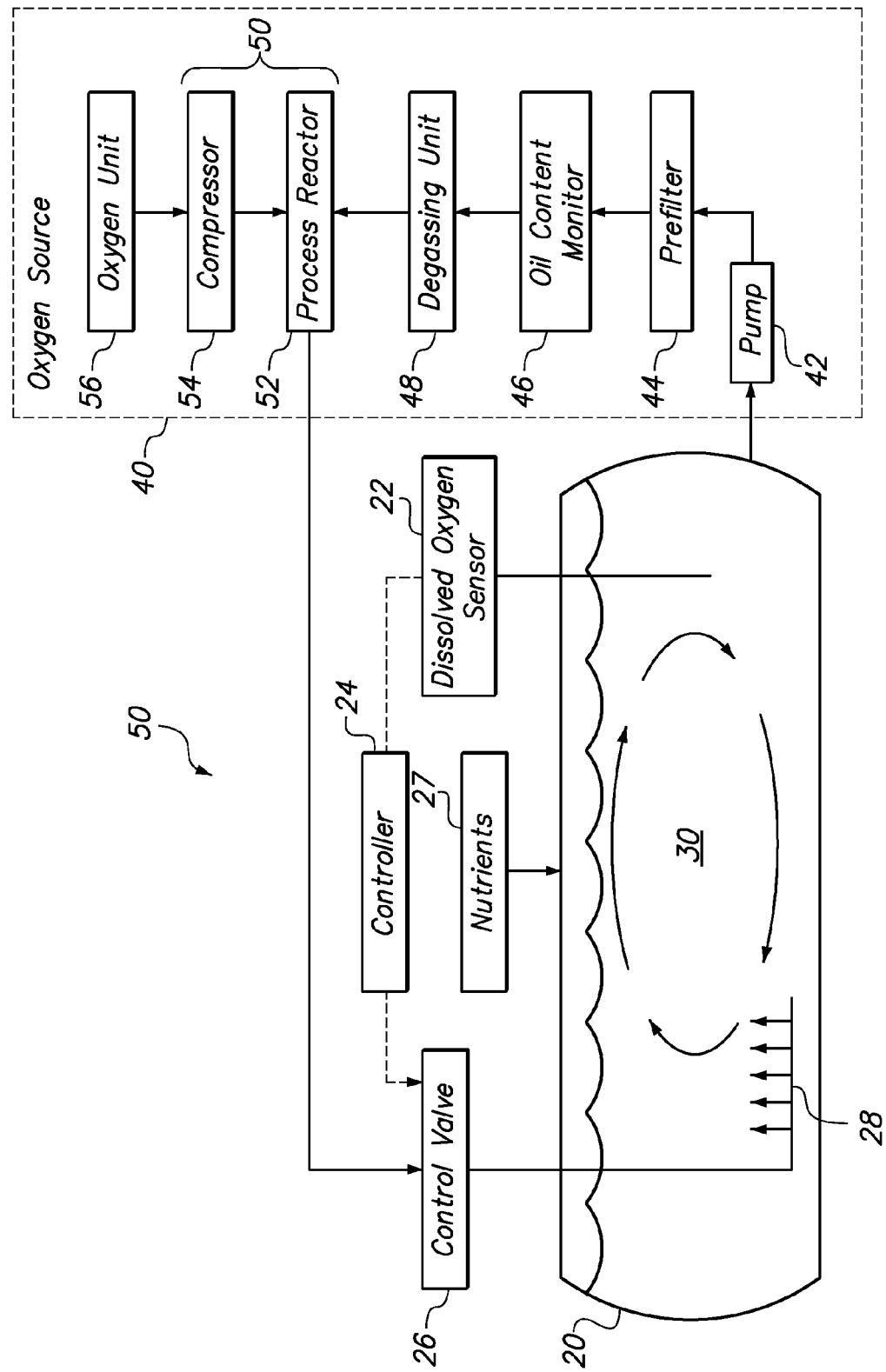
FIG. 2 is a diagram of an apparatus for performing bioremediation of contaminants in wastewater, including an oxygenation system that uses a portion of the wastewater as a carrier fluid.

FIG. 2 is a diagram of a system 50 for performing bioremediation of contaminants in the oily wastewater 30. The oily wastewater was held in a 3000 gallon double wall stainless steel tank 20 (horizontal cylindrical type) equipped with Hach DO probes 22. The system further included a Hach SC-100 controller 24 for operating the control valve 26. The oxygen source 40 included an air operated diaphragm pump 42 that provided a positive feed pressure to a filter 44. The filter assembly 44 was fitted with a thirty micron (30μ) media set to remove larger suspended solids upstream of an oil content monitor (OCM) 46 and the inlet to the oxygen delivery system. The wastewater was then directed into a degassing unit 48 to remove any excess wastewater gases and elevated dissolved oxygen (DO) from the water before entering the process reactor 52 of the dissolved oxygen delivery subsystem 50. An OGSI PSA oxygen generator system (a pressure swing absorption unit from Oxygen Generating Systems International) served as the oxygen unit 56, which provided oxygen to a compressor 54 that provided the oxygen under pressure to the process reactor 52. The wastewater, serving as a carrier fluid, was pumped into the process reactor 52 at the same time as oxygen gas was forced into the reactor by the compressor 54. The two streams become infused to provide a high concentration of dissolved oxygen in the water. The high DO water is held within the reactor until a demand condition exists. Accordingly, the process reactor 52 was able to deliver water with a high concentration of dissolved oxygen to the wastewater 30 through the control vale 26.

As the DO sensor 22 indicated that the DO concentration was at or below the lower DO setpoint, the controller 24 would open the control valve 26 and allow the high DO water to travel through the delivery tubing to the submerged nozzle or manifold 28 within the tank 20. The DO sensor 22 was installed in the tank 20 at the opposite end from the injection nozzles 28. The DO concentration within the tank was used to manage the injection cycle in order to maintain a sufficient concentration of DO to support accelerated biological activity. The lower DO setpoint was set at four (4) parts per million (ppm) and the upper DO setpoint was set at eight (8) ppm. The controller would automatically open the control valve to deliver high DO water in response to the DO concentration dropping to the lower set point, and automatically close the control valve in response to the DO concentration rising to the upper DO setpoint.

The nutrient formulation was manually added at approximately the same time daily to ensure the enhanced levels of bio-stimulation and increased biological activity of the native bacteria and microbial populations. One (1) pound of the nutrient formulation was added daily and approximately five (5) pounds of nutrient were applied total throughout the test. The nutrient formulation was applied directly to the wastewater in the tank and was mixed into the wastewater by the circulation caused by the injection of high DO water through the nozzles.

During the five days of the process, the high DO water was injected for a total of 10.24 hours. The first DO demand cycle began after six (6) hours of testing and the time between DO injection cycles reduced to every two (2) hours by the second day of the test. By the last day of the test (Day 5), the DO injection cycle was occurring every twenty (20) minutes. A total of 5,428 gallons of DO enhanced water was injected during the pilot test.

After the first day of operation, the testing was interrupted for a period of three (3) days before the operation could resume for an additional four days. Even after just one day of operation, the hydrocarbon odors in the tank were noticeably reduced. After the fifth day of operation, a light tan post-treatment sample was collected and submitted to a laboratory for analysis of wastewater parameters via Japanese Industrial Standard (JIS K 0102). Tables 1-2, below, summarize the analytical results from the pretreatment sample and the post treatment sample.

Based on the post-treatment analytical results, only zinc (6.1 mg/L), coliform colony (4,100 colonies per cubic centimeter; colonies/cm$^3$), and mineral oil (8.2 mg/L) were detected at concentrations above the JEGS. Even so, the zinc and mineral oil levels were significantly reduced and could certainly have been reduced below the JEGS levels had the test been extended. Coliform Colony was analyzed via Ordinance 1, Ministry of Welfare.

TABLE 1

Pre and Post Treatment Test Results in Comparison to JEGS

| | JEGS | Pretreatment (Before Day 1 of treatment) | Post-treatment (After Day 5 of treatment) |
|---|---|---|---|
| Copper (mg/L) | 3 | 2.2 | 0.3 |
| Zinc (mg/L) | 5 | 18 | 6.1 |
| Coliform Colony (colonies/cm$^3$) | 3,000 | 170 | 4,100 |
| Mercury (mg/L) | 0.005 | 0.0012 | <0.0005 |
| Lead and its Compounds (mg/L) | 0.1 | 0.02 | 0.01 |
| Boron and its Compounds (mg/L) | 230 | 3 | 2 |
| Ammonia (mg/L) | 100 | 4.4 | 34 |
| Nickel (mg/L) | 1 | 0.67 | 0.45 |
| Fluoride and its Compounds (mg/L) | 15 | 1 | 1 |

TABLE 2

Pre and Post Treatment Test Results in Comparison to JEGS

| | JEGS | Pretreatment (Oct. 25, 2010) | Post-treatment (Nov. 5, 2010) | % Reduction |
|---|---|---|---|---|
| pH | 5.0-9.0 | 6.5 | 6.6 | Not Applicable |
| BOD (mg/L) | 160 | 220 | 16 | 94% |
| COD (mg/L) | 160 | 120 | 30 | 75% |
| TSS (mg/L) | 200 | 1,200 | 29 | 97% |
| Mineral Oil (mg/L) | 5 | 630 | 8.2 | 98% |

TABLE 2-continued

Pre and Post Treatment Test Results in Comparison to JEGS

| | JEGS | Pretreatment (Oct. 25, 2010) | Post-treatment (Nov. 5, 2010) | % Reduction |
|---|---|---|---|---|
| Animal & Vegetable Fat (mg/L) | 30 | 200 | 5.5 | 97% |
| Nitrogen (mg/L) | 120 | 43 | 110 | + |
| Phosphorous (mg/L) | 16 | 1.8 | 1.5 | 17% |

The process was successful in stimulating native bacteria to digest hydrocarbons at an accelerated rate utilizing a combination of a nutrient formulation and oxygenation. The test showed that using the enhanced nutrient formulation and maintaining a DO concentration of 4 to 8 ppm in the wastewater reduced the contaminant concentrations in the wastewater in five (5) testing days: BOD concentration was reduced 94%, chemical oxygen demand (COD) concentration was reduced 75%, TSS was reduced 97%, Mineral oil concentration was reduced 98%, and animal and vegetable fat concentrations were reduced 97%. Such a significant reduction of various contaminants in such a short period of time is unprecedented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for bioremediation of contaminants, comprising:
   contacting a contaminant with composite particles of a microbial available nutrient formulation including at least one microbial available nutrient species and at least one fatty acid species;
   oxygenating water on-site to form oxygenated water including greater than about 4 parts per million dissolved oxygen; and
   contacting the contaminant with the oxygenated water.

2. The method of claim 1, wherein the contaminant is disposed in water.

3. The method of claim 1, wherein the contaminant is disposed in soil.

4. The method of claim 1, wherein a major portion of the contaminant is a hydrocarbon.

5. The method of claim 1, wherein the contaminant includes fats, oil, grease or a combination thereof disposed in water.

6. The method of claim 1, wherein the contaminant is a nitrogen-containing contaminant or a phosphorus-containing contaminant.

7. The method of claim 1, wherein the microbial available nutrient formulation is coated with the fatty acid species.

8. The method of claim 1, wherein the oxygenated water includes greater than 50 parts per million dissolved oxygen.

9. The method of claim 1, wherein the at least one fatty acid species causes the composite particles to be oleophilic.

10. The method of claim 1, wherein the at least one fatty acid comprises a saturated fatty acid selected from the group consisting of stearic acid, palmitic acid, and mixtures thereof and an unsaturated fatty acid selected from the group consisting of oleic acid, linoleic acid and mixtures thereof.

11. The method of claim 10, wherein the at least one fatty acid further comprises an amine substituted form of a fatty acid selected from the group consisting of amine substituted forms of stearic acid, palmitic acid and oleic acid, and wherein the ratio of saturated:unsaturated:amine-substituted fatty acids is in the range of about 30:68:2 to about 65:30:5 by weight.

12. The method of claim 1, wherein the microbial available nutrients comprise nitrogen in the form of an ammonium compound, phosphorus in the form of a microbial available phosphate compound, and iron in a form of microbial available iron compound.

13. The method of claim 1, wherein the water is oxygenated using a device selected from an aspirator, aerator, impeller and diffuser.

14. The method of claim 1, wherein the step of oxygenating water includes collecting water that is in contact with the contaminant, introducing oxygen into the collected water, and reintroducing the oxygenated water into contact with the composite particles.

15. The method of claim 14, wherein the step of reintroducing the oxygenated water includes supplying the oxygenated water through a laminar flow nozzle.

16. The method of claim 1, further comprising:
   maintaining a dissolved oxygen concentration of greater than 4 ppm in the water contacting the contaminant.

17. The method of claim 16, further comprising:
   measuring the dissolved oxygen concentration with a dissolved oxygen sensor disposed in the water contacting the contaminant.

18. The method of claim 1, further comprising:
   introducing non-indigenous microbes into the oxygenated water.

19. The method of claim 1, further comprising:
   introducing enzymes into the oxygenated water.

20. The method of claim 1, wherein the contaminant includes a metal.

21. The method of claim 1, wherein the contaminant includes a heavy metal.

22. The method of claim 1, wherein the contaminant includes a metal selected from zinc, copper, mercury, lead, nickel, and combinations thereof.

* * * * *